United States Patent
Hayami

(10) Patent No.: US 9,600,751 B2
(45) Date of Patent: Mar. 21, 2017

(54) IMAGE FORMING APPARATUS AND CONTROL METHOD THEREOF WITH A DETERMINATION WHETHER AN APPLICATION RELATES TO A DYNAMIC UPDATE FOR REFLECTING CHANGE OF THE NETWORK SETTING WITHOUT REBOOTING THE APPARATUS

(71) Applicant: CANON KABUSHIKI KAISHA, Tokyo (JP)

(72) Inventor: Yoshikazu Hayami, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/620,890

(22) Filed: Feb. 12, 2015

(65) Prior Publication Data
US 2015/0242721 A1  Aug. 27, 2015

(30) Foreign Application Priority Data
Feb. 24, 2014  (JP) .................................. 2014-032980

(51) Int. Cl.
G06F 3/12 (2006.01)
G06K 15/00 (2006.01)

(52) U.S. Cl.
CPC ......... G06K 15/40 (2013.01); G06K 15/4045 (2013.01)

(58) Field of Classification Search
CPC . G06K 15/1805; G06F 3/1204; G06F 3/1285; G06F 3/1238; G06F 3/1222;
(Continued)

(56) References Cited

U.S. PATENT DOCUMENTS

| 7,068,383 B1* | 6/2006 | Bello | G06F 3/1204 358/1.15 |
| 2008/0071941 A1* | 3/2008 | Imai | H04L 43/0817 710/19 |
| 2009/0094660 A1 | 4/2009 | Weaver et al. | |

FOREIGN PATENT DOCUMENTS

| JP | H06105039 A | 4/1994 |
| JP | 2008-27379 A | 2/2008 |
| KR | 10-2008-0047368 A | 5/2008 |

OTHER PUBLICATIONS

Korean Office Action in corresponding KR 10-2015-0024954 dated Dec. 16, 2016 (9 pages).

* cited by examiner

Primary Examiner — Gabriel Garcia
(74) Attorney, Agent, or Firm — Fitzpatrick, Cella, Harper & Scinto

(57) ABSTRACT

A network device communicates with a management server that manages a general-use setting an individual setting as a master data. The network device includes a first receiving unit configured to receive a first instruction associated with an input from a user for the general-use setting; a second receiving unit configured to receive a second instruction indicating an initialization processing; a first requesting unit configured to request for the management server in accordance with the first instruction; a second requesting unit configured to request for the management server in accordance with the second instruction; an executing unit configured to execute the initialization processing in accordance with the second instruction; a query unit configured to perform a query for the management server; and a reflecting unit configured to reflect the general-use setting, which is acquired from the management server in accordance with the query, for the database.

17 Claims, 17 Drawing Sheets

| Item name | Constant name | Constant value |
|---|---|---|
| IPv4 address | IP_V4_ADDRESS | 101 |
| IPv6 address | IP_V6_ADDRESS | 102 |
| Subnet mask | SUBNET_MASK | 103 |
| Gateway address | GATEWAY_ADDRESS | 104 |
| Use of DHCP ON/OFF | DHCP_ON_OFF | 105 |
| ... | ... | ... |

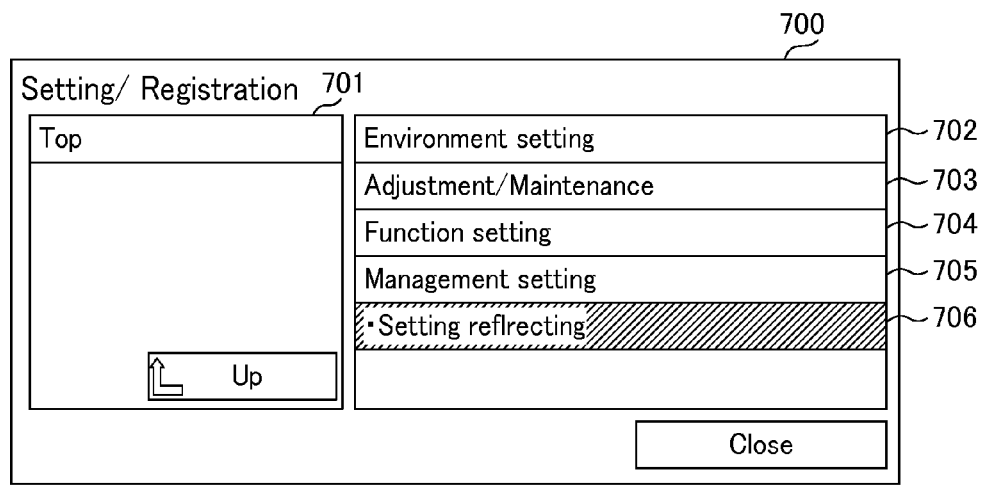
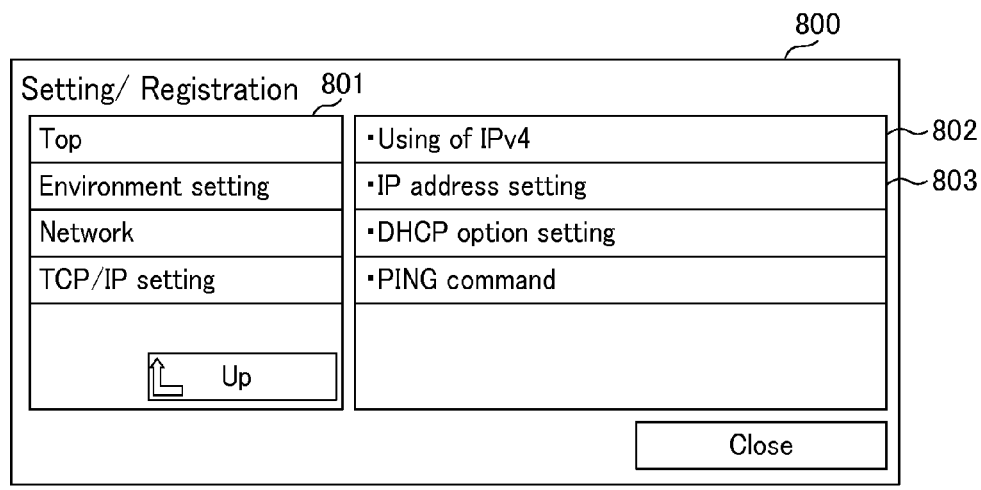

FIG. 13

| Login service | | | |
|---|---|---|---|
| | | 1302 ☑ Even if the setting of the network is changed, the image forming apparatus is not rebooted. | |
| Application name | Date of install | Application ID | State |
| Login application A | 2012/9/20 | 4d06d282-deb4-462e-bd48-71367c177 | Start | Switch | Uninstall |
| Login application B | 2012/9/20 | 6f28f494-deb4-462e-bd48-71367c177 | Stop | Switch | Uninstall |

1300, 1301

IMAGE FORMING APPARATUS AND CONTROL METHOD THEREOF WITH A DETERMINATION WHETHER AN APPLICATION RELATES TO A DYNAMIC UPDATE FOR REFLECTING CHANGE OF THE NETWORK SETTING WITHOUT REBOOTING THE APPARATUS

BACKGROUND OF THE INVENTION

Field of the Invention

The present invention relates to a technique for rebooting an image forming apparatus.

Description of the Related Art

Japanese Patent Laid-Open No. H06-105039 discloses a technique for rebooting an application program of a digital copying machine.

Assume, for example, the case where a network setting is changed in association with a change of a surrounding network configuration in an image forming apparatus that comprises a network communication function and can perform an application program (hereinafter refer as "application"). In this case, if the application is an application which uses a network, the application is required to reflect any settings. For example, if the application is an application which creates a socket based on an IP address while starting the application, the socket is required to be recreated by following the change of the IP address of the image forming apparatus. Such an application, in which a network setting is reflected while starting the application, must be rebooted if a network setting is changed while activating the application. At this time, the application that can be automatically rebooted itself is an application which corresponds to a dynamic update.

In contrast, there is an application which must be activated constantly as long as the image forming apparatus can perform the application. Since such an application does not correspond to the dynamic update, of course the application cannot be automatically rebooted itself.

Therefore, the technique described in Japanese Patent Laid-Open No. H06-105039 cannot handle for the application that cannot be automatically rebooted itself.

SUMMARY OF THE INVENTION

The present invention realizes rebooting an image forming apparatus if an application does not correspond to a dynamic update when a network setting of the image forming apparatus is changed. Thus, the present invention provides an image forming apparatus that can reflect the change of a network setting even if the application itself cannot be rebooted.

According to an embodiment of the present invention, an image forming apparatus is provided that includes a changing unit configured to change a network setting; a determination unit configured to determine whether or not an application corresponds to a dynamic update for reflecting the change of the network setting without rebooting the image forming apparatus; and a controlling unit configured not to reboot the image forming apparatus associated with the change of the network setting if the determination unit determines that the application corresponds to the dynamic update for the change of the network setting, and to reboot the image forming apparatus if the determination unit determines that the application does not correspond to the dynamic update for the change of the network setting.

According to the present invention, the image forming apparatus is rebooted if the application corresponds to the dynamic update when the network setting of the image forming apparatus is changed. Thus, the present invention can provide an image forming apparatus that can reflect the change of a network setting even if the application itself cannot be rebooted.

Further features of the present invention will become apparent from the following description of exemplary embodiments with reference to the attached drawings.

BRIEF DESCRIPTION OF THE DRAWINGS

FIG. 7 is a diagram illustrating an example of a UI related to a change of a setting of the image forming apparatus.

FIG. 8 is a diagram illustrating an example of the UI related to the change of a setting of the image forming apparatus.

FIG. 13 is a diagram illustrating an example of a UI of a login management screen.

DESCRIPTION OF THE EMBODIMENTS

First Embodiment

An image forming apparatus comprising a network communication function mounts an application operation environment as represented by, for example, JAVA (registered trademark) environment to thereby use the portability of a program contained by the environment. Thus, the image forming apparatus can provide an extensible application. In order to improve the function and the usability of the image forming apparatus, the application that operates under the environment as described the above is created and installed in the image forming apparatus, to thereby realize a desired function by the application. For example, it is possible to provide an embedded function such as copy, scan, printing, and the like as the application.

Figure 1:
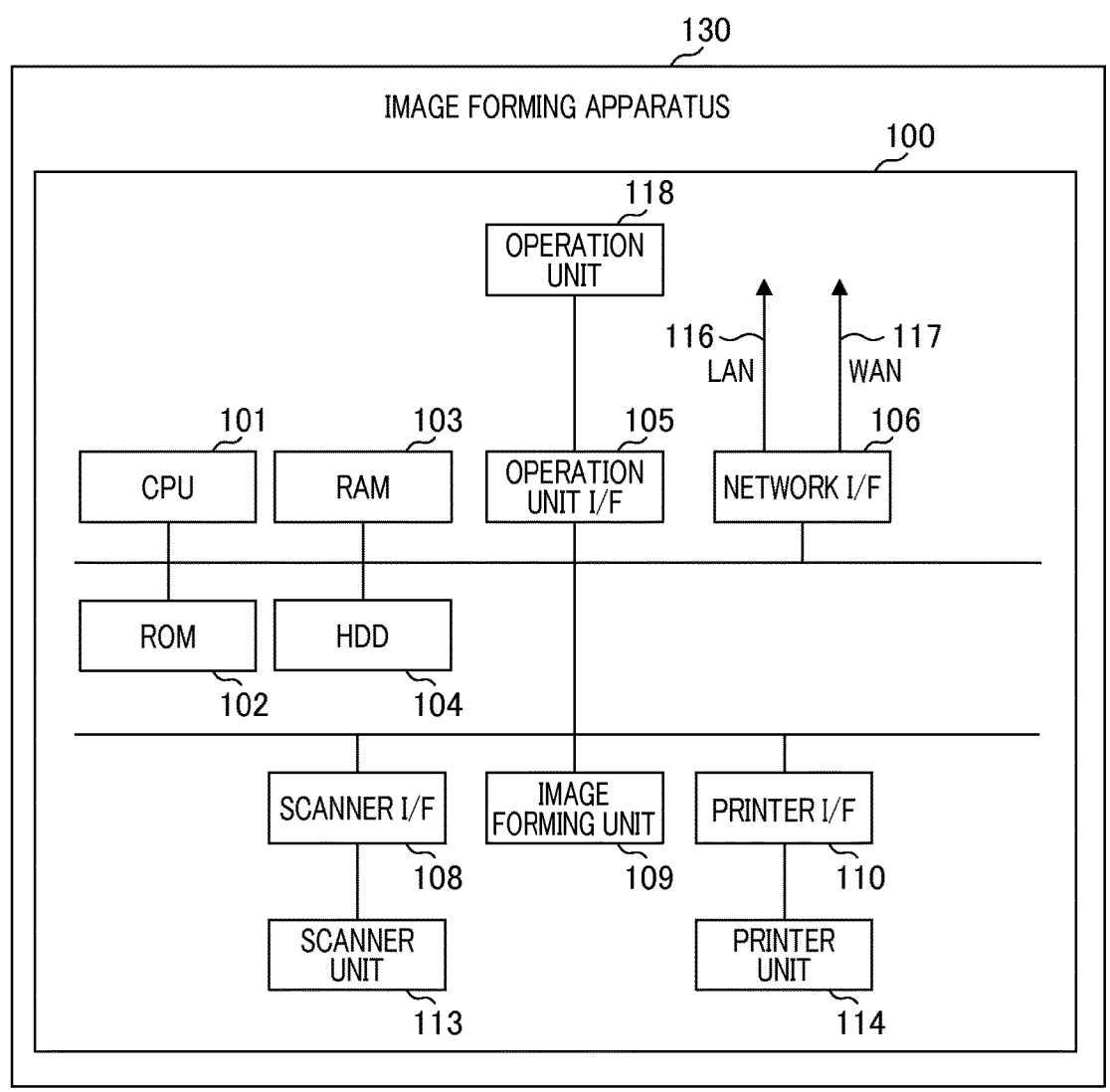
FIG. 1 is a diagram illustrating a hardware configuration of an image forming apparatus.

Firstly, a description will be given of a configuration of an image forming apparatus 130 that can perform the application as described above. FIG. 1 is a diagram illustrating a hardware configuration of the image forming apparatus 130 that comprises a printing function, a scan function, a network communication function, and the like. In FIG. 1, a controller 100 is a controller of the image forming apparatus 130. The controller 100 is electrically connected to a scanner unit 113 and a printer unit 114, while being connected to an external device via a LAN (Local Area Network) 116.

A CPU (Central Processing Unit) 101 centrally controls an access to various hardware while connected based on a control program and the like stored in a ROM (Read Only Memory) 102. Also, the CPU 101 centrally controls various processing performed within the controller 100. The ROM 102 is a read-only non-volatile memory area, and stores a boot program and the like of the image forming apparatus 130. A RAM (Random Access Memory) 103 is a system working memory for operating the CPU 101 and is a memory for temporarily storing various types of data. The RAM 103 consists of a SRAM in which the contents can be held after power-off, a DRAM in which the contents are erased after power-off, and the like.

A HDD (Hard Disk Drive) 104 is a non-volatile memory area and stores a system application and the like. A firmware including the application to be installed shown in FIG. 3 as described below is stored in the HDD 104. An operation unit I/F 105 is an interface unit connecting a system bus 119 and an operation unit 118. More specifically, the operation unit I/F 105 receives data to be displayed on the operation unit 118 from the system bus 119, displays the data, and outputs input information from the operation unit 118 to the system bus 119. An instruction of a user and information presentation for the image forming apparatus 130 is performed via the operation unit 118.

A network I/F 106 connects to the LAN 116, a WAN (Wide Area Network) 117, and the system bus 119, and performs input and output of information with the outside. A scanner I/F 108 performs correction, treatment, and editing for image data received from the scanner unit 113. An image forming unit 109 performs direction conversion, image compression, expansion, and the like for the image data. A printer I/F 110 receives the image data transmitted from the image forming unit 109 and prints in the printer unit 114 after image forming.

Figure 2:
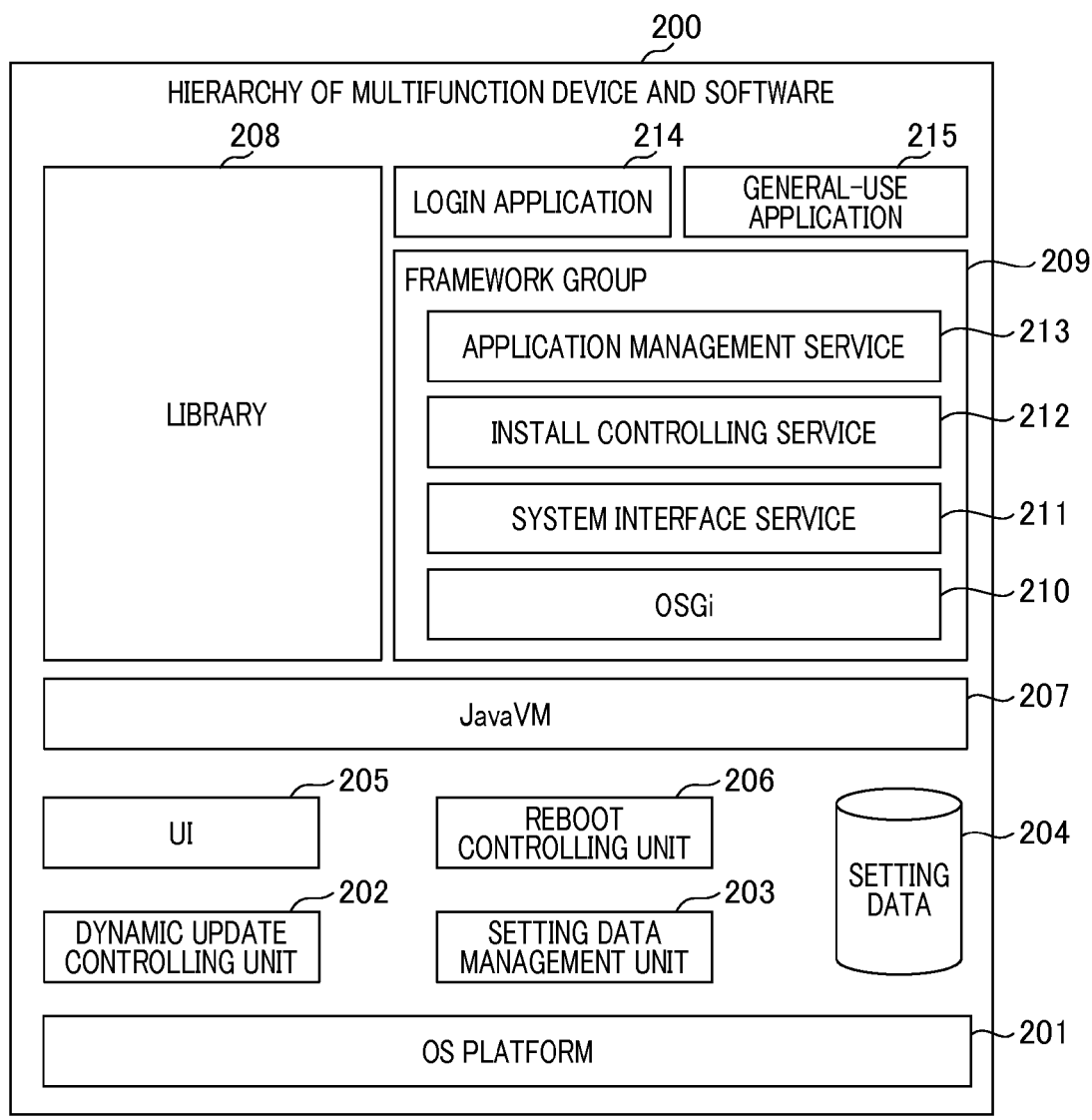
FIG. 2 is a diagram illustrating a hierarchy of a software module of the image forming apparatus.

FIG. 2 is a diagram illustrating a hierarchy of a software module of the image forming apparatus 130 according to the present embodiment. Note that each of the software shown in FIG. 2 and after is stored in the ROM 102 or the HDD 104, and is performed in the CPU 101. Also, various types of information used while executing are held in the RAM 103 or the HDD 104 and are exchanged between the software functions. In addition, communication with an external device is performed using the network I/F 106.

Next, a description will be given of each of the software. Software 200 includes an operating system (OS) platform 201. A dynamic update controlling unit 202 is a module for determining and controlling how the appropriate updating is performed when the setting is changed. A setting database 204 is a database for handling the setting data of the image forming apparatus 130, including the network settings. A setting data management unit 203 manages the data, and each application queries the setting data management unit 203 about the contents of the data, to thereby acquire the contents.

A UI 205 is a user interface module and is an interface that performs mediation between the apparatus and the user operation when the operator performs various operations and settings for the image forming apparatus 130. The module transfers the input information and requests the processing to various modules described below or performs the change and the like of the data setting in accordance with the operation of the operator. A reboot controlling unit 206 is a module that performs rebooting of the image forming apparatus in response to the instruction to reboot.

Next, a software platform is configured as a Java (registered trademark) runtime environment VM 207 and is configured by the Java (registered trademark) VM 207 as the printer, a library 208, and a framework group 209. The library 208 is configured by a standard API library. The framework group 209 is configured by a OSGi 210, and the OSGi 210 activates a plurality of applications on the single Java (registered trademark) VM 207. Also, the OSGi 210 provides the management function for the lifecycle of the application, the communication function between the applications, and a plurality of system services is installed in advance on the OSGi 210.

The system service manages a plurality of application groups, and includes an application management service 213 for adding, updating, and deleting a new application. The application management service 213 performs the addition, the update, and deletion of the applications. A system interface service 211 is a service for providing an information exchanging function between the application and the image forming apparatus 130. With respect to the request from the application and the application providing service, the system interface service 211 is used, for example, for notifying the application about an event such as the change of the setting or requesting the controlling LED or buzzer for equipment from the application. The OSGi 210 sequentially activates the system interface service 211, an install controlling service 212, an application management service 213, and the like, which are described below, in accordance with a startup order list stored in the HDD 104 during the starting the image forming apparatus 130.

A general-use application (a second application) 215 is an installable application which can be stopped at any timing while activating the image forming apparatus. In the image forming apparatus 130, the application 215 provides various types of processing to the user. Such a general-use application 215 is required to be rebooted in accordance with the timing of the update of the network setting. By rebooting the application, the reflecting of the settings is incorporated in a starting initialization processing.

In contrast, there are a login application and the like for managing a login user. A login application (a first application) 214 is an application that cannot stopped because any given application may query login information at any time during login. If the login application is stopped, the application that is using data associated with the login information fails to acquire the data, thereby causing operation problems because the login information cannot be acquired. Here, the login information refers to information for a login name, mail address, and the like of the user who is currently logged in to the image forming apparatus 130. Switching to another login application is required and one application must always be active in order to stop any login application. In this case, it is assumed that the other application is installed, and the application cannot be stopped if there are not other applications. Therefore, since the login application cannot to be rebooted similar to the general-use application, the login application is required in order to reboot the image forming apparatus.

Due to the above characteristic, the login application 214 is always operated while activating the image forming apparatus 130. The general-use application 215 that realizes the various functions operates under management of the application management service 213. The application management service 213 holds application information that includes a version of an added application under management, license information, and the like. Furthermore, the application management service 213 removes the general-use application 215 from the application to be managed in response to an uninstall instruction of the application in the image forming apparatus 130.

Next, a description will be given of the role of the system interface service 211 shown in FIG. 2 according to the present embodiment with reference to FIG. 3. Firstly, the system interface service 211 acquires setting data to be dynamic updated from the setting data management unit 203 (301) while starting the image forming apparatus 130 and holds the value as an initial setting data value in the setting data 302 on the RAM 103. Note that the setting data will be described below with reference to FIG. 4.

Also, the system interface service 211 receives a dynamic update listener registration for a dynamic update event from an application 300 while starting the image forming apparatus 130 (303). The dynamic update listener registration can be received from a plurality of applications. The application 300 may be the application management service 213 that is the system service or any application such as the login application 214, the general-use application 215, and the like. The system interface service 211 manages the registered application as the list. In addition, the system interface service 211 performs a callback function registration for the dynamic update controlling unit 202 corresponding to the dynamic update while starting the image forming apparatus 130 (305). With this registration, the registered function (call function) is called from the dynamic update controlling unit 202 if the dynamic update is performed (306).

If the callback function is called, the system interface service 211 acquires the setting data from the setting data management unit 203 and compares the setting data with the setting data 302, which is setting data held on the RAM 103, while starting. As a result of the comparison, if the setting data are difference each other, it is regarded as the setting data having been updated, and the setting data 302 is also updated. If at least one of the setting data is updated, all applications received on the dynamic update listener registration 303 (304) are notified about the setting update event. When notification about the event has been provided, the updated setting data information is added. The added information is a string constant name and a constant value corresponding to the updated item shown in FIG. 4 as described below. Note that a plurality of items may be included at one notification.

Figures 3, 4:
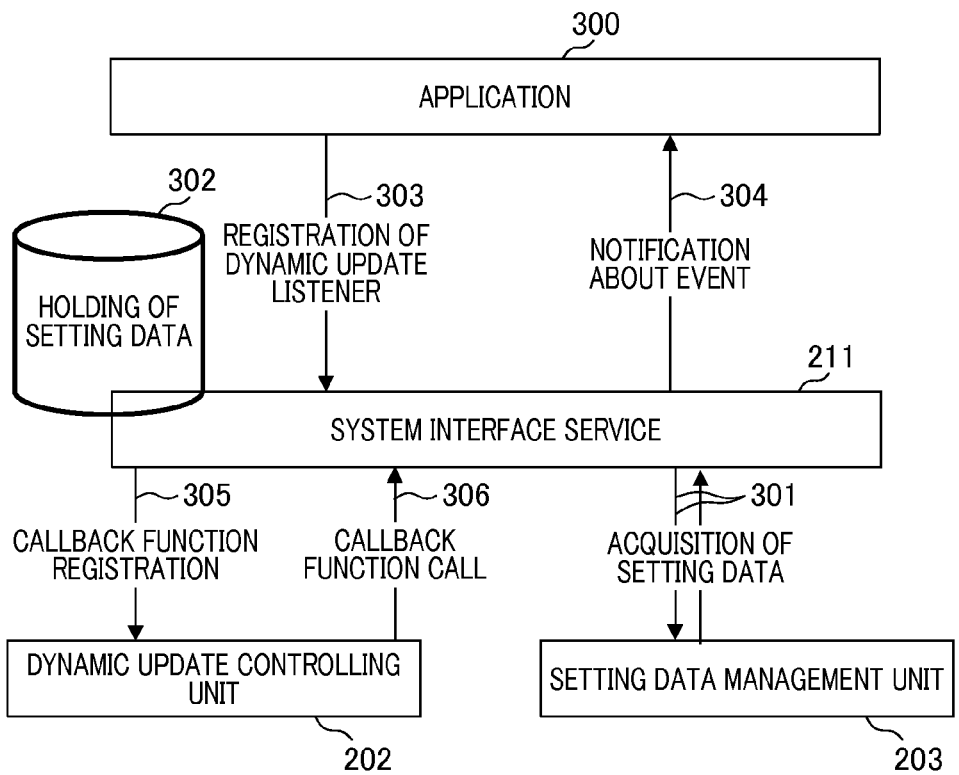
FIG. 3 is a block diagram illustrating a role of a system interface service.
FIG. 4 is a diagram illustrating an example of an item of a network setting.

FIG. 4 is a diagram illustrating an example of an item of the network setting that the system interface service 211 holds in the setting data 302. An item name indicates an item for each setting, and the string constant name and the constant value corresponding to the item are assigned to the item name. The string constant name and the constant value is information with which the dynamic update event is associated.

Figure 5:
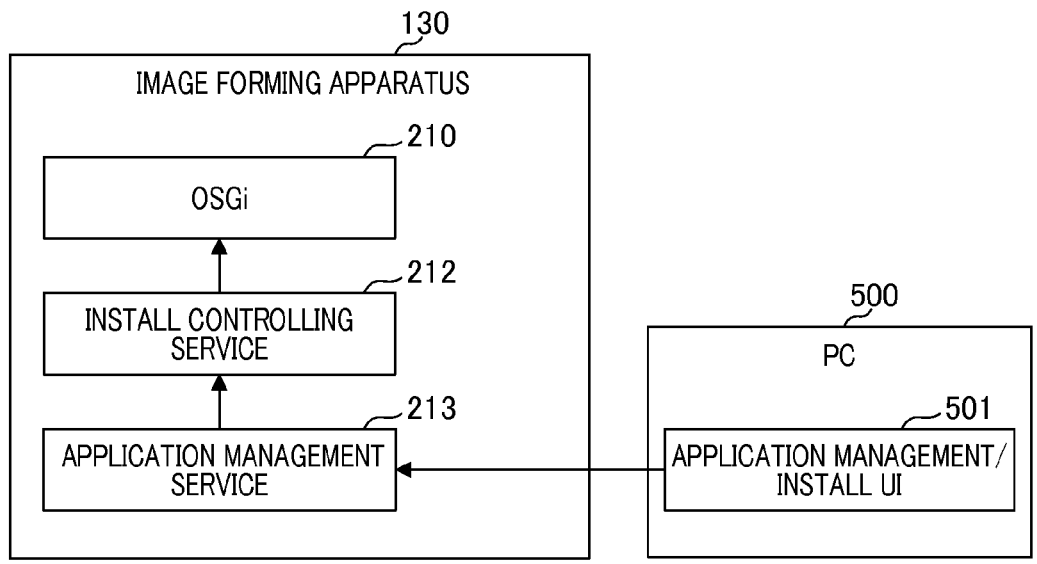
FIG. 5 is a diagram illustrating a flow of installation of an application.

FIG. 5 is a diagram illustrating a flow of the installation of the application from a PC 500 to the image forming apparatus 130. An application management UI 501 consists of a web page as shown in a login application management UI 1300 in FIG. 13, described below, is displayed on a web browser of the PC 500, application management is performed, and an application to be installed is specified and installed. The application management service 213 that has received the application specified by the UI 501 transfers the information, such as the received application, to the installing controlling service 212. The installing controlling service 212 that has received the application information requests the OSGi 210 to perform the installation. The OSGi 210 performs the installation using the received application information. The application that has been installed is managed by the application management service 213.

Figure 6:
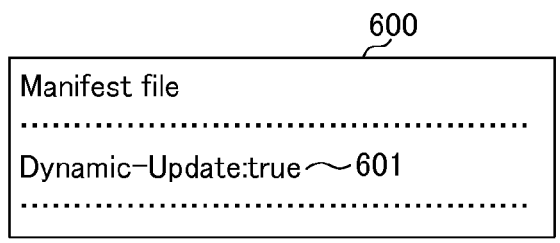
FIG. 6 is a diagram illustrating a manifest in which a dynamic update flag is specified.

FIG. 6 is a diagram illustrating a manifest file in the login application 214 or the general-use application 215. A manifest file 600 is described in the form of the version, a property value of jar file, a manifest item and a corresponding value. A dynamic update flag (Dynamic-Update) 601 is one of the manifest files and indicates whether or not the application corresponds to the dynamic update. In the present embodiment, "true", which indicates that the application corresponds to the dynamic update, is specified.

Here, the application that corresponds to the dynamic update denotes an application that picks up the setting change event from the system interface service 211 and performs the processing for reflecting the change of the setting. That is, the application that has received the dynamic update event has a mechanism for acquiring the updated setting value from the setting data management unit and dynamically reflecting the setting in the setting itself. In contrast, in the application that does not correspond to the dynamic update, the dynamic update flag in the manifest file 600 is specified "false" or the dynamic flag is not described. The application which does not correspond to the dynamic update must be lead to reboot the image forming apparatus 130 while changing the setting or to reboot the application itself by the application management service 213.

Next, a description will be given of the procedure for changing the setting from the operation unit 118 of the image forming apparatus 130 with reference to FIGS. 7 to 9. Firstly, an operating unit screen 700 in FIG. 7 illustrates the operating unit 118 of the image forming apparatus 130. A list 701 indicates a position in the hierarchical structure of the setting and indicates that the position is currently located at the top position in FIG. 7. On the right side of FIG. 7, buttons of the setting items are arranged for each type of the setting item. The items set in the top are an environment setting button 702, an adjustment/maintenance button 703, a function setting button 704, a management setting button 705, and the like. In FIG. 8, as described below, a setting reflecting button 706 is pressed when the content of the setting item is changed shown. This button is linked to the change of the setting, and if the change of the setting is not performed, the button is, for example, grayed out and cannot be pressed.

In FIG. 8, a screen 800 illustrates a UI while changing the setting for the network. A list 801 indicates, from the top, an environment setting>a Network>a TCP/IP setting in order, and the TCP/IP setting is currently performed in FIG. 8. The TCP/IP setting is set by, for example, a IPv4 setting button 802 for setting whether or not the IPv4 is used, a IP address setting button 803 for setting the IP address, and the like. If these buttons are pressed, the content of each item can be further set.

Figure 9:
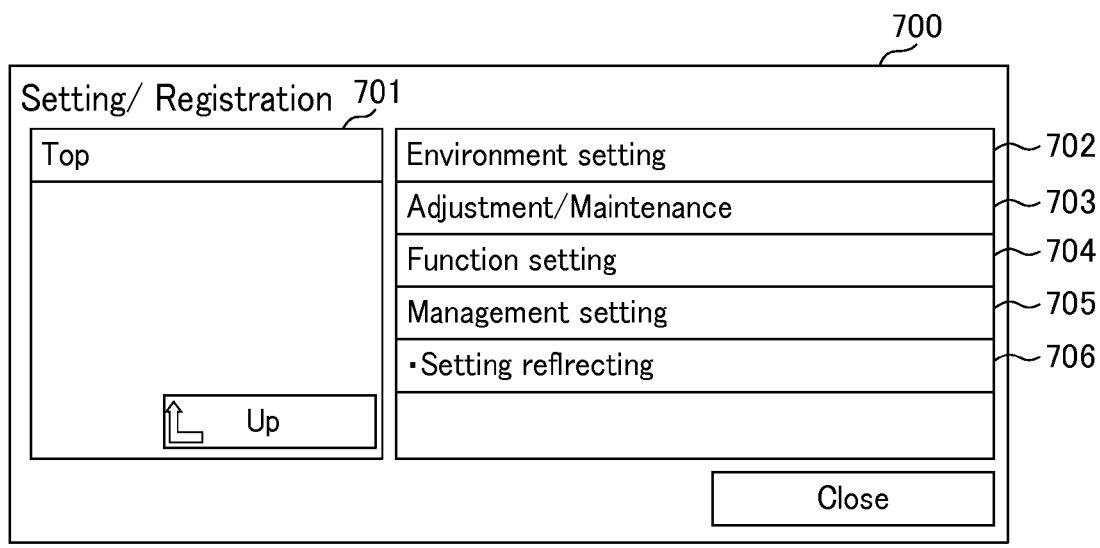
FIG. 9 is a diagram illustrating an example of the UI related to a change of a setting of the image forming apparatus.

Next, FIGS. 8 and 9 illustrate returning to the top screens after changing the setting of each setting item. At this time, the setting reflecting button 706 is not grayed out and can be pressed in FIG. 8 because this is after the change of the setting. If the setting reflecting button 706 is pressed, a confirmation screen shown in FIG. 10 or 11, as described below, is displayed depending on the conditions at that time.

Figure 10:
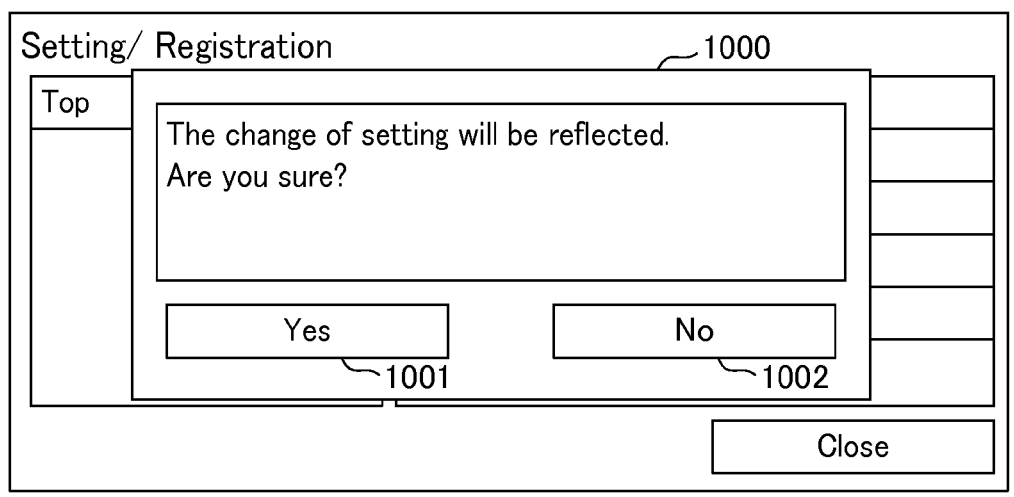
FIG. 10 is a diagram illustrating an example of a confirmation screen of the change of setting.

FIG. 10 is a diagram illustrating a setting change confirmation UI 1000 if the image forming apparatus 130 is not required to reboot. If the user queries whether or not the change of the setting is reflected and the user presses a "YES" button 1001, the setting is reflected without rebooting the image forming apparatus 130. In contrast, if the user presses a "NO" button 1002, the change of the setting is canceled.

Figure 11:
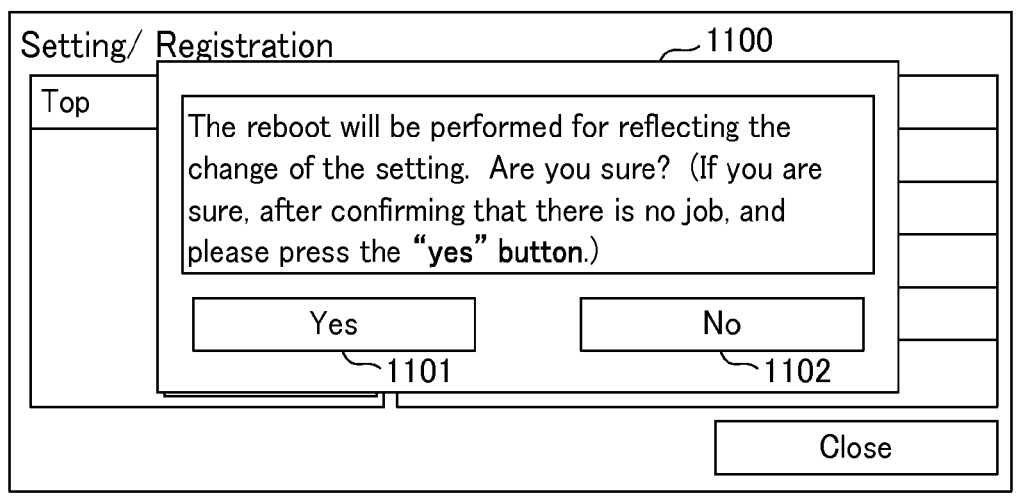
FIG. 11 is a diagram illustrating an example of a confirmation screen of the change of a setting.

FIG. 11 is a diagram illustrating a setting change confirmation UI 1100 if the image forming apparatus 130 is required to reboot. If the user queries whether or not the image forming apparatus 130 is rebooted in order to reflect the change of the setting and the user presses a "YES" button 1101, the image forming apparatus 130 starts to reboot and the setting is reflected after rebooting. In contrast, if the user presses a "NO" button 1102, the change of the setting is canceled.

Figure 12:
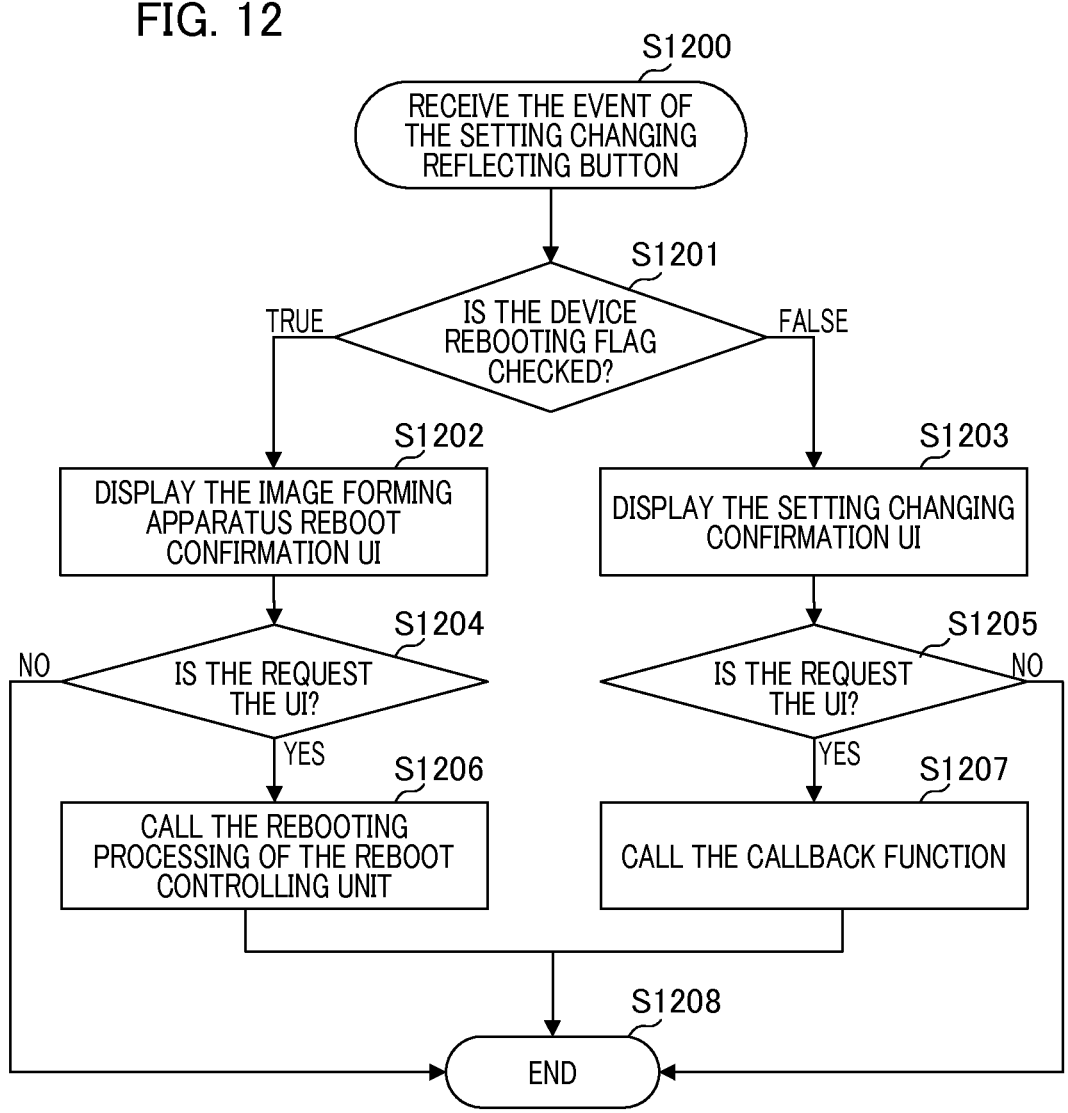
FIG. 12 is a flowchart illustrating the processing of a dynamic update controlling unit.

FIG. 12 is a flowchart illustrating the processing of the dynamic update controlling unit 202. Firstly, in step S1200, the dynamic update controlling unit 202 receives the setting changing reflecting button event from the UI 205 due to an event in which the setting reflecting button 706 shown in FIG. 7 is pressed as a trigger. Next, in step S1201, a state of the device rebooting flag is checked (determined). The device rebooting flag is a value managed by the dynamic update controlling unit 202, has "TRUE/FALSE" as a value, and is held in the HDD 104.

The flag is set "TRUE/FALSE" by the application management service in accordance with the flow in FIG. 14, as described below. Note that a default value while starting is "FALSE". If the state of the flag is in "FALSE" in step S1201, the processing proceeds to step S1203. Then, the setting changing confirmation UI 1000 shown in FIG. 10 is displayed and, in step S1205, waits for the request of the UI 205. If the user selects the "YES" button 1001 (YES), in step S1207, the call back function of the system interface service 211 is called, and the reflecting of the change of the setting is performed. In contrast, if the user selects the "NO" button 1002 in step S1205, the processing proceeds to step S1208 and the processing ends.

In contrast, if the state of the flag is "TRUE", the processing proceeds to step S1202. Then, the image forming apparatus reboot confirmation UI 110 is displayed on the UI 205, and, in step S1204, waits for the request of the UI 205. If the user selects the "YES" button 1101 (YES), the rebooting processing of the reboot controlling unit 206 is called, and the image forming apparatus 130 is rebooted. In contrast, if the user selects the "NO" button 1102 in step S1204 (NO), the processing proceeds to step S1208 and the processing ends.

FIG. 13 is a diagram illustrating a login application management UI, which is one of a management form of the application management UI 501. As shown in a list 1301, a summary of the installed login applications and the state of each login application can be confirmed. Here, there is a check box 1302 indicating "even if the setting of the network is changed, the image forming apparatus is not rebooted". The check box is used in the case where although the application is not the login application that does not correspond to the dynamic update, the image forming apparatus 130 is not to be rebooted. The value of the check box is held on the HDD 104 and is managed by the application management service 213. Not that, since the value is held on the HDD 104, the value remains to be held. If the check box 1302 is set to "ON", the device rebooting flag is set to "FALSE". In contrast, if the check box 1302 is set to "OFF", the device rebooting flag is set to "TRUE".

Figure 14:
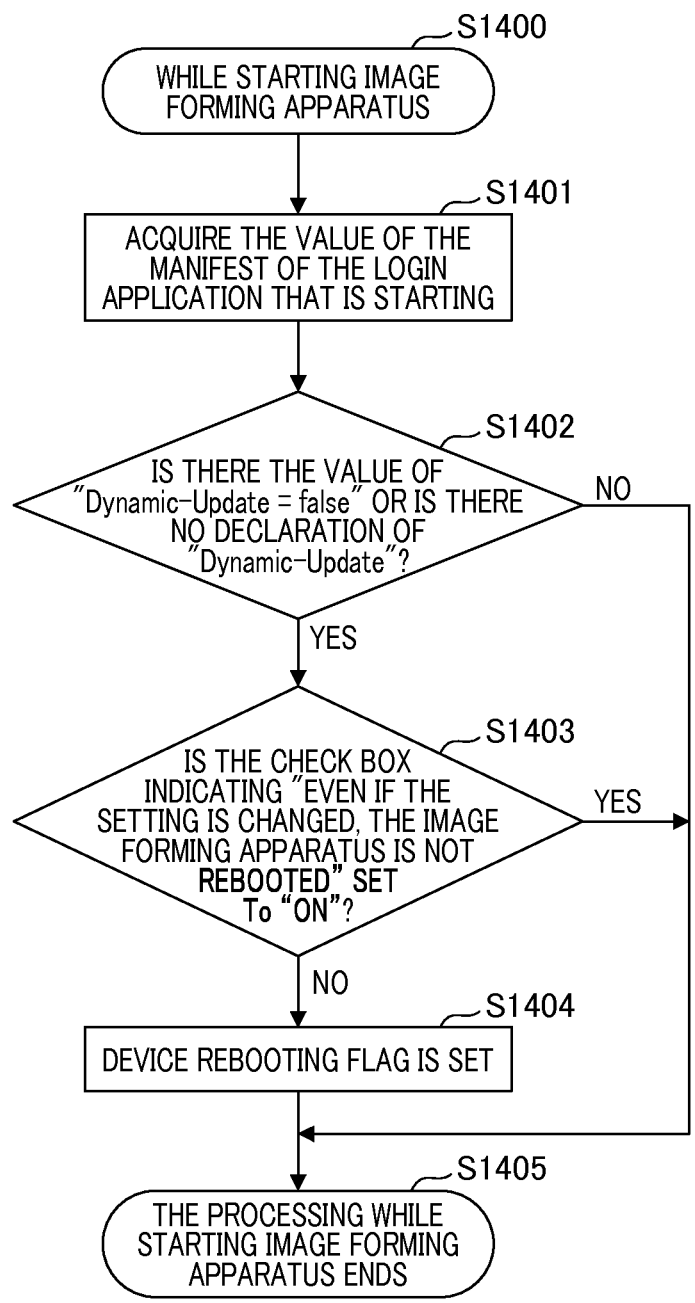
FIG. 14 is a flowchart illustrating the processing performed while starting the image forming apparatus.

FIG. 14 is a flowchart illustrating the processing performed by the application management service 213 while starting the image forming apparatus 130. Firstly, in step S1400, the processing of the application management service 213 is started while starting the image forming apparatus 130. Next, in step S1400, the application management service 213 acquires the manifest value of the login application which is starting, and the processing proceeds to step S1402. In step S1402, it is determined whether or not the value of "Dynamic-Update" is "FALSE" or there is not the item (declaration) for the "Dynamic-Update". If the value of "Dynamic-Update" is "FALSE" or there is not the item (declaration) for the "Dynamic-Update" (YES), the processing proceeds to step S1403 because the login application does not correspond to the dynamic update of the network setting. In step S1403, it is determined whether or not the check box 1302 indicating "even if the setting of the network is changed, the image forming apparatus is not rebooted" is set to "ON". If the check box 1302 is set to "OFF" (NO), the processing proceeds to step S1404, and the application management service 213 sets the device rebooting flag to "TRUE". Then, the processing proceeds to step S1405, and the processing ends.

Note that the check box 1302 indicating "even if the setting of the network is changed, the image forming apparatus is not rebooted" may not be provided. If the check box is not provided, the determination in step S1403 is not performed, and if the determination in step S1402 is YES, the processing proceeds to step S1404.

In contrast, if the value of "Dynamic-Update" is "TRUE" (NO), the processing is not performed, proceeds to step S1405, and ends. Also, if the check box 1302 is "ON" (YES), the processing is not performed, proceeds to step S1405, and ends. In this case, since the processing is not performed, the device rebooting flag remains "FALSE". Note that, in the present embodiment, although the check box 1302 indicating "even if the setting of the network is changed, the image forming apparatus is not rebooted" is provided, the check box 1302 does not have to be provided. If the check box is not provided, the determination in step S1403 is not performed, and if the determination in step S1402 is YES, the processing proceeds to step S1404.

Figure 15:
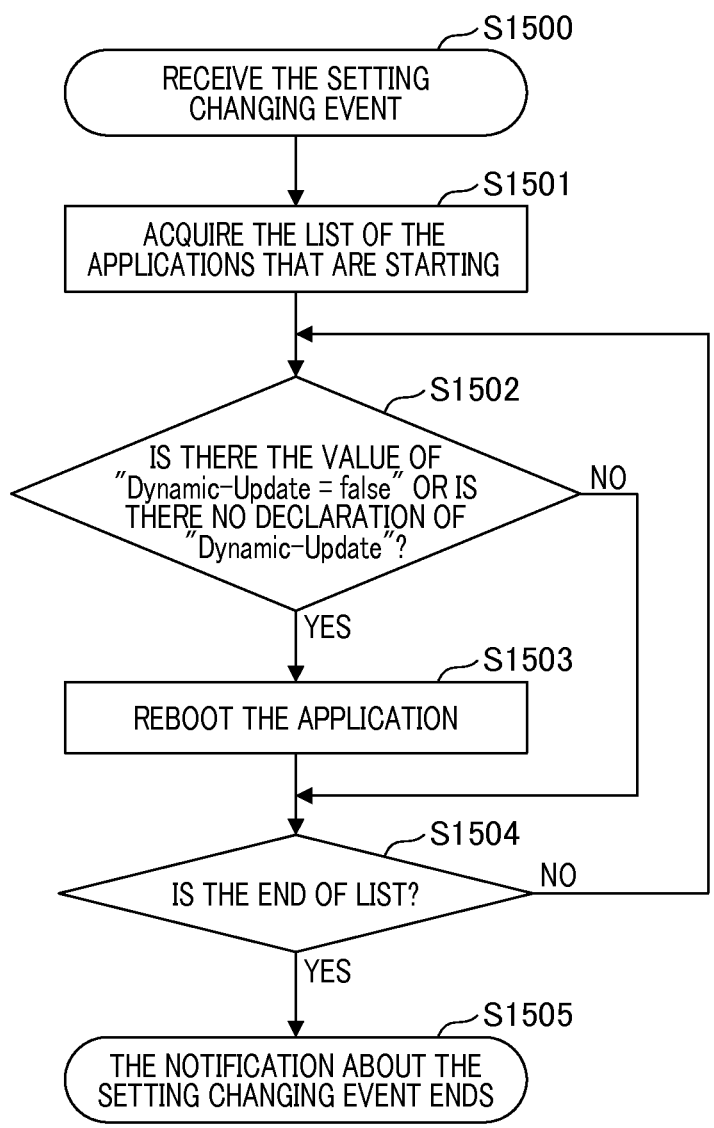
FIG. 15 is a flowchart illustrating the processing performed when a setting changing button is pressed.

FIG. 15 is a flowchart illustrating the processing performed by the application management service 213 when a setting reflecting button 706 is pressed. This processing corresponds to the processing when the user presses the "YES" button 1001 for reflecting the change of the setting in FIG. 10. Firstly, in step S1500, the processing of the application management service 213 is started. Next, in step S1501, the application management service 213 acquires the list of the applications that are starting among the general-use applications managed by the application management service 213. Next, in step S1502, the value of the manifest of the application that is first acquired in step S1501 is acquired, and it is determined whether or not the value of "Dynamic-Update" is "FALSE" or the item (declaration) of the "Dynamic-Update" is not present.

If the value of "Dynamic-Update" is "FALSE" or there is not the item (declaration) of the "Dynamic-Update" (YES), the processing proceeds to step S1503 and the rebooting processing of the application for which the application is stopped and started is performed. In contrast, if the value of "Dynamic-Update" is "TRUE" (NO) is present, the processing is not performed and proceeds to step S1504. Then, in step S1504, it is determined whether or not the check (determination) has been performed to the end of the list of the applications that are starting. If the check is not performed to the end of the list (NO), the processing returns to step S1502, and the processing is performed for the next application. In contrast, if the check is performed to the end of the list (YES), in step S1505, the processing ends.

Figure 16:
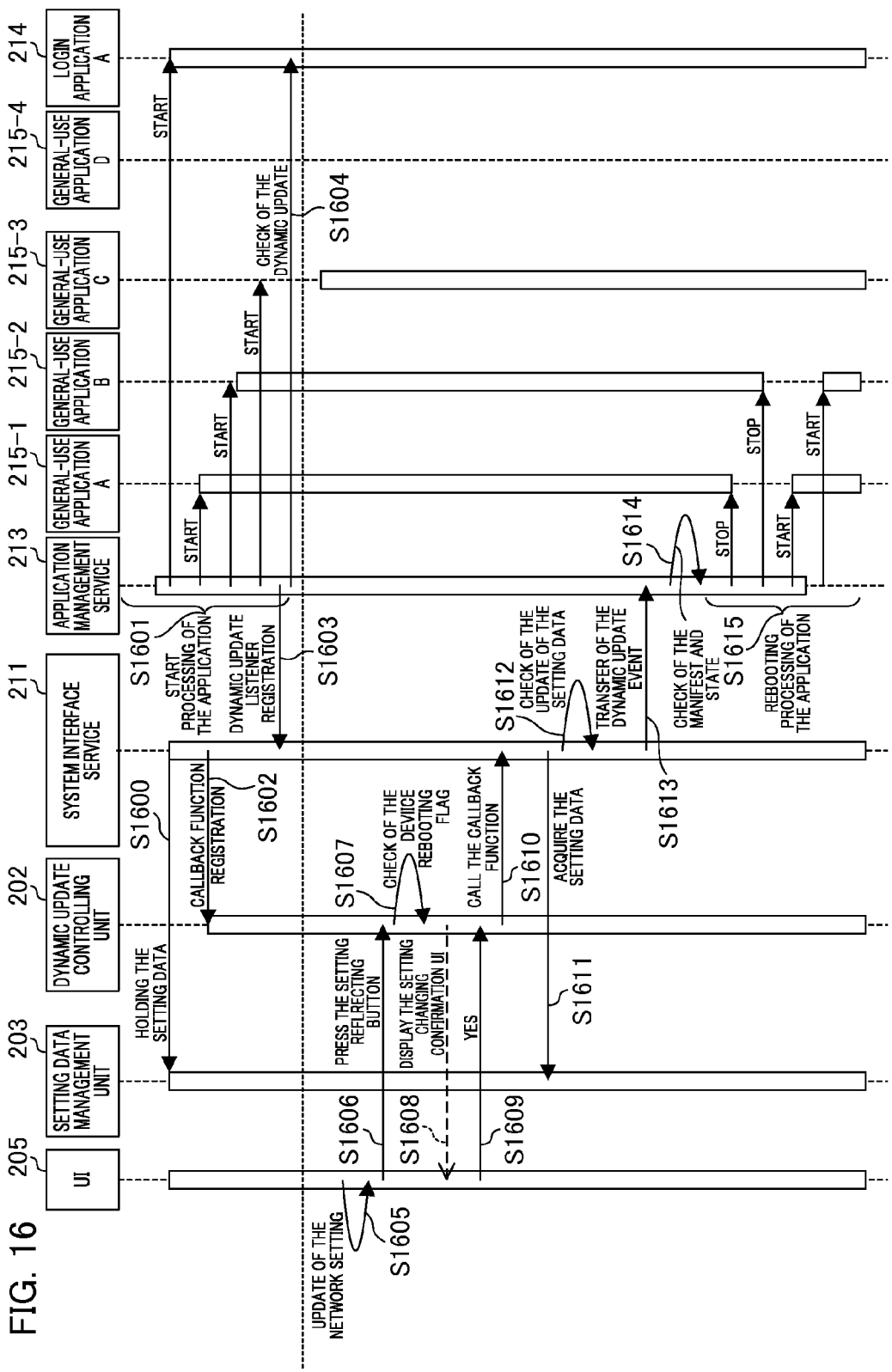
FIG. 16 is a sequence diagram illustrating the processing performed from start to the change of a setting.

FIG. 16 is a sequence diagram illustrating the processing of each service performed from the starting of the image forming apparatus 130 to the change of a setting. In the present embodiment, a description will be given in the case that the login application corresponds to a dynamic update. Firstly, a description will be given of the situation of the processing as a whole. The configuration from the UI 205 at left side of FIG. 16 to the application management service 213 illustrates each service shown in FIG. 2. The configuration from the general-use applications 215-1 to 215-4 is installed following four applications and in the following state.

A general-use application A (215-1): "Dynamic-Update": "false", and starting

A general-use application B (215-2): not corresponding to "Dynamic-Update", and starting A general-use application C (215-3): "Dynamic-Update": "true", and starting A general-use application D (215-4): not corresponding to "Dynamic-Update", and stopping Also, according to the login application, the login application A 214 ("Dynamic-Update": "true") that corresponds to the dynamic update is starting.

Next, a description will be given of each sequence. Firstly, in step S1600, the system interface service 211 acquires the setting data from the setting data management unit 203 and holds the value of the setting value on the RAM 103 while starting the image forming apparatus. Next, in step S1611, the application management service 213 performs the starting processing of the general-use applications A 215-1, B 215-2, C 215-3, and D 215-4 and the login application A 214. Thus, the processing of each application is started. Next, in step S1602, the system interface service 213 performs the callback function registration for the dynamic update controlling unit 202. Thus, if the setting is changed, the registered callback function is called.

Next, in step S1603, the application management service 213 performs the dynamic update listener registration in the system interface service 211. Thus, the system interface service 211 notifies the application management service about the dynamic update event while changing the setting. Next, in step S1604, as described in the flow in FIG. 14, the application management service 213 checks the value of the manifest of the login application. In the present embodiment, since the login application A 214 is an application that corresponds to the dynamic update ("Dynamic-Update": "true"), the processing is not performed. The above processing is processing performed while starting the image forming apparatus 130.

Additionally, in the above state, in step S1605, the update of the network setting is performed by the UI 205. Also, a description will be given in the case where the setting reflecting button 706 is pressed on the operating unit confirmation screen 700, as shown in FIG. 9. At this time, in step S1606, the UI 205 notifies the dynamic update controlling unit 202 about the setting button pressed event. Next, in step S1607, the dynamic update controlling unit 202 checks the device rebooting flag. At this time, since the device rebooting flag remains the default "OFF", in step S1608, the setting changing confirmation UI 1000 shown in FIG. 10 is displayed. In addition, in step S1609, if the user presses the "YES" button 1001, in step S1610, the callback function registered by the dynamic update controlling unit 202 is called from the system interface service 211.

Next, in step S1611, the system interface service 211 acquires the setting data from the setting data management unit 203. Then, in step S1612, the system interface service 211 compares the setting data with the setting data held by the system interface 211. Here, if one or more data are different, the setting data is considered to be updated, and in step S1613, the system interface service 211 notifies the application management service 213 about the dynamic update event. In step S1614, the application management service 213 that receives the dynamic update event, as shown in the flow in FIG. 15, checks the manifest. Then, in step S1615, the application management service 213 performs the rebooting processing for the relevant application. Thus, the content of the updated setting is applied in the initialization processing during the general-use application by rebooting the general-use application itself, without rebooting the image forming apparatus 130.

Figure 17:
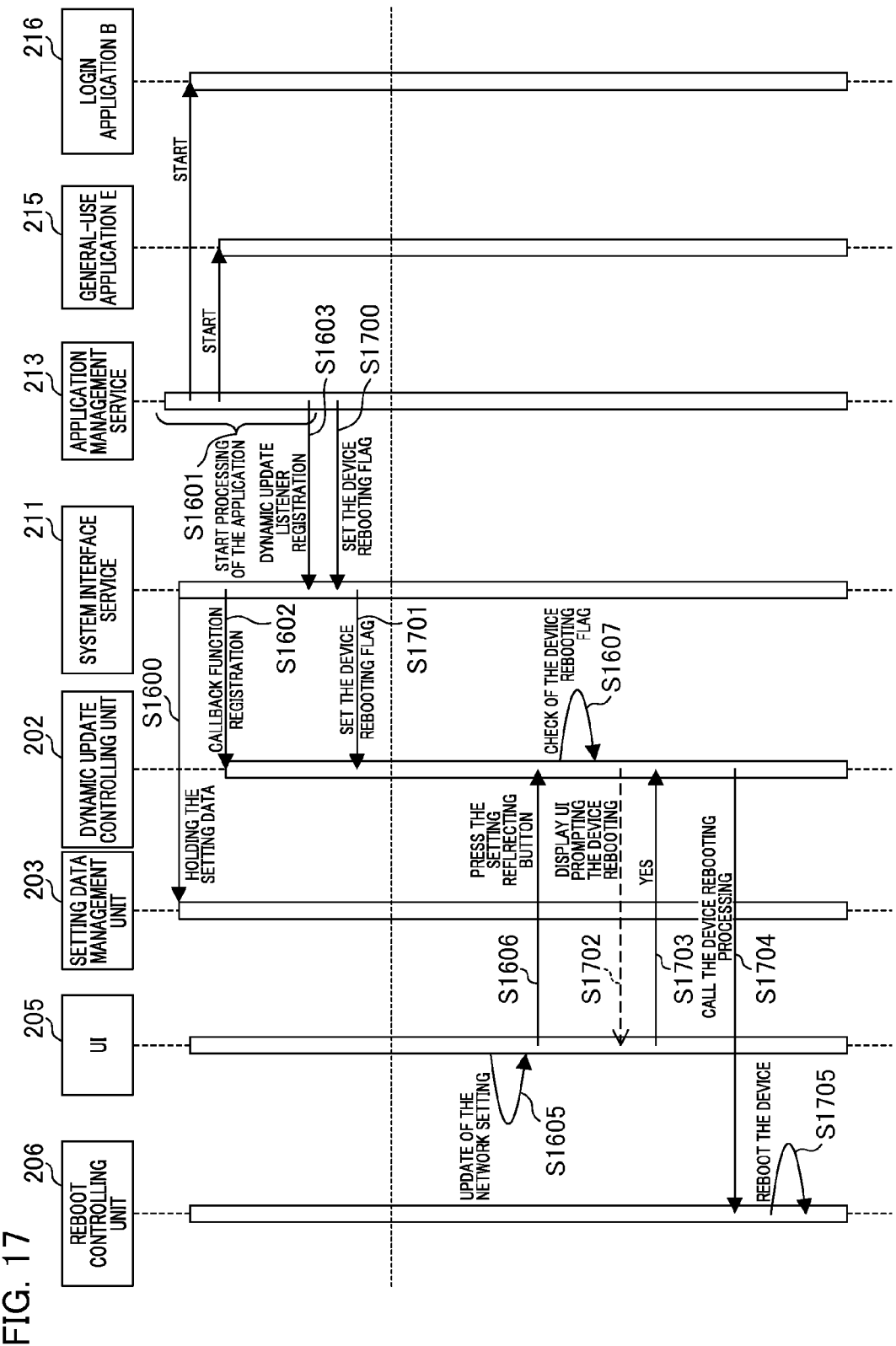
FIG. 17 is a sequence diagram illustrating the processing performed from start to the change of a setting.

FIG. 17 is a sequence diagram illustrating the flow of the processing performed by each service from the starting of the image forming apparatus 130 to the change of a setting. In the present embodiment, since the login application is an application that does not correspond to the dynamic update, a description will be given in the case where the image forming apparatus 130 is required to be rebooted. Firstly, a description will be given of the situation of the processing as a whole. The configuration from the reboot controlling unit 206 at the left side in FIG. 17 to the application management service 213 illustrates each service shown in FIG. 2. It is assumed that the general-use application E 215 is installed blow application.

A general-use application E (215): "Dynamic-Update": "false" and starting

Also, in the login application, the login application B 216, which does not correspond to the dynamic update, is starting.

Next, a description will be given of each sequence. Since the processing from steps S1600 to S1603 is the same as the processing shown in FIG. 16, the description thereof is omitted. In step S1603, the application management service 213 checks the value of the manifest of the login application B 216 as shown in the flow in FIG. 14. Here, since the login application B 216 does not correspond to the dynamic update, the application management service 213 sets the rebooting flag to "TRUE" in steps S1700 and S 1701.

Additionally, in the above state, in step S1605, the update of the network is performed by the UI 205. Also, in the operating confirmation screen 700 shown in FIG. 9, a description will be given in the case where the setting reflecting button 706 is pressed. At this time, in step S1606, the UI 205 notifies the dynamic controlling unit 20 about the setting button pressed event2. Next, in step S1607, the dynamic update controlling unit 202 checks the device rebooting flag. At this time, since the device rebooting flag is set to "TRUE" in step S1701, in step S1702, the dynamic update controlling unit 202 performs the UI display leading to the reboot of the image forming apparatus.

As described the above, according to the present embodiment, the processing is performed by separating whether the image forming apparatus is rebooted or the application is rebooted depending on the type of the application during the change of the setting of the image forming apparatus, rebooting the image forming apparatus for which the setting has changed is performed the minimum necessary and the reflecting of the setting is efficiently performed.

Second Embodiment

Figure 18:
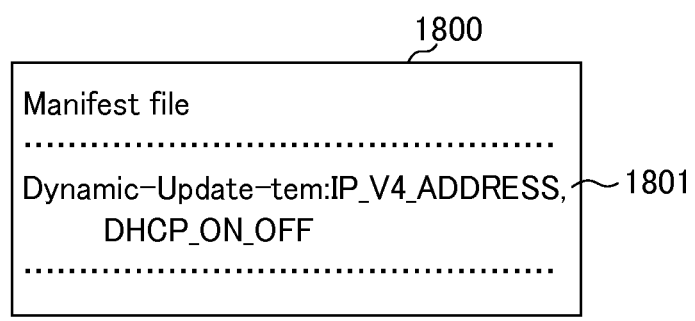
FIG. 18 is a diagram illustrating the manifest in which the dynamic update flag is specified.

In the present embodiment, a description will be given of the processing that determines whether or not the rebooting of the application is performed depending on the item in which the setting is changed when the setting changing button is pressed in the state shown in the first embodiment. FIG. 18 is a diagram illustrating a manifest file 1800 in the login application 214 or the general-use application 215. A dynamic update flag ("Dynamic-Update-Item") 1801 is one of the manifest items. The string constant name corresponding to the item of each setting, as shown in FIG. 4, is specified for the item which corresponds to the dynamic update. Note that the item which is not described in the specification is assumed to be an item does not correspond to the dynamic update.

In the present embodiment, the change of the use of the IPv4 address and the DHCP, and the change of ON/OFF indicates that the item corresponds to the dynamic update. Therefore, the reflecting of the change of the settings for these items is performed itself. Therefore, since an item other than these items does not correspond to the dynamic update, the application management service 213 is required to lead to the rebooting of the image forming apparatus 130 or rebooting the application itself. Note that, in the present embodiment, a description will be given of the rebooting of the application itself.

Figure 19:
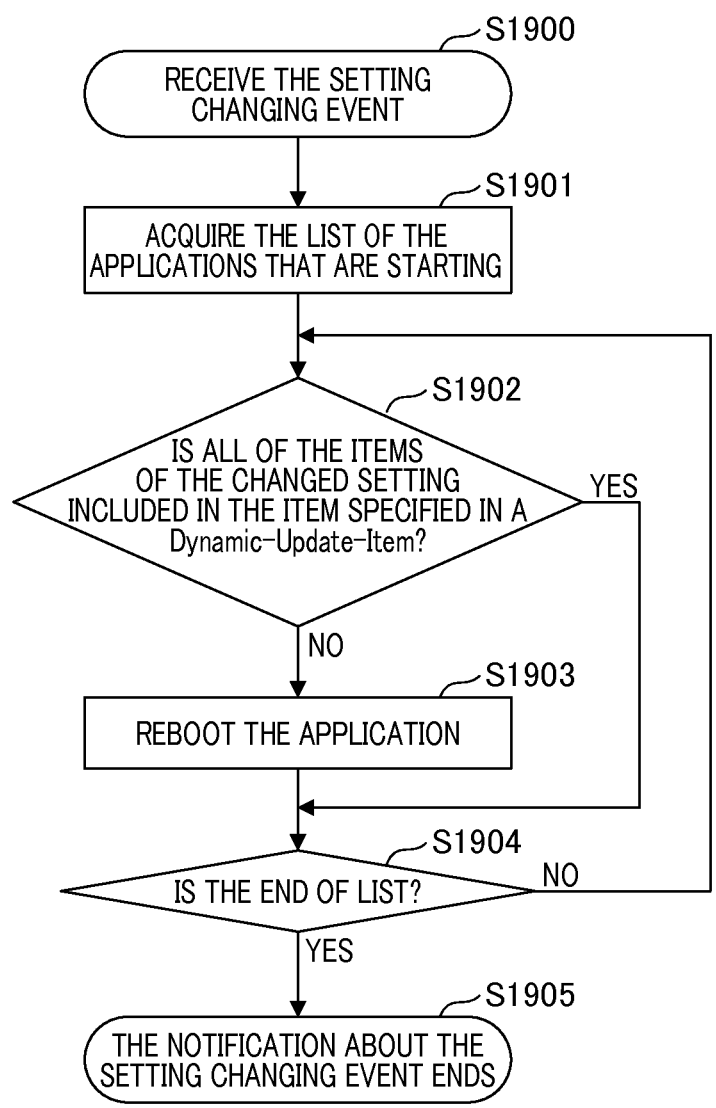
FIG. 19 is a flowchart illustrating the processing performed when the setting changing button is pressed.

Next, FIG. 19 is a flowchart illustrating the processing of the application management service 213 performed when the setting reflecting button 706 is pressed. Note that the processing corresponds to the processing when the user presses the "YES" button 1001 in the determination whether or not the change of the setting is reflected in FIG. 10. Firstly, in step S1900, the processing of the application management service while updating the setting is started. Next, in step S1901, the list of the applications that are starting among the general-use applications managed by the application management service 213 is acquired. Next, in step S1902, the value of the manifest of the first application acquired in step S1901 is acquired and it is determined whether or not all of the items of the changed setting included in the setting changing event are included in a Dynamic-Update-Item 1801.

If none of the items is included in the Dynamic-Update-Item 1901 (NO), the processing proceeds to step S1903, otherwise, if all of the items are included in the Dynamic-Update-Item 1901 (Yes), the processing proceeds to step S1904. In the present embodiment, a description will be given of the application having the manifest shown in FIG. 18. Note that if the item of the changed setting is "IP_V4_ADDRESS" and "IP_V6_ADDRESS", the "IP_V4_ADDRESS" is included in the manifest in FIG. 18, while the "IP_V6_ADDRESS" is not included. Therefore, in this case, the determination in step S1902 is "NO", and the processing proceeds to step S1903. In step S1903, the rebooting processing of the application, which is an application that has stopped, is started is performed. In contrast, if the item of the changed setting is "IP_V4_ADDRESS" and "DHCP_ON_OFF", both items of the setting are included in the manifest in FIG. 18. Therefore, in this case, the determination in step S1902 is "YES", the processing is not performed, and the processing proceeds to step S1904. Then, in step S1904, it is determined whether or not the check is performed on the end of the list of the application which is starting. If the check is not performed on the end of the list (NO), the processing returns to step S1902, and the processing is performed for the next application. In contrast, if the check is performed on all applications (YES), in step S1905, the processing ends.

As described the above, according to the present embodiment, it is possible to control whether or not the application is rebooted depending on the item of the changed setting included in the setting changing event.

Third Embodiment

Figure 20:
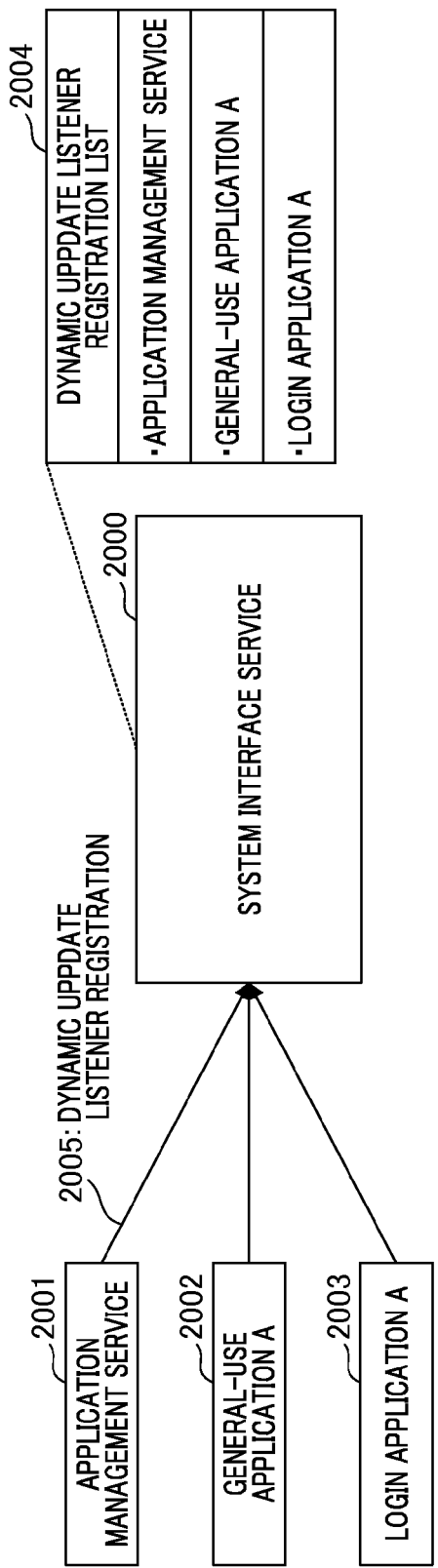
FIG. 20 is a schematic diagram illustrating a dynamic update listener registration.

In the present embodiment, a description will be given in the case where the determination of whether or not the application is an application that corresponds to the dynamic update in the state shown in the first embodiment is not performed depending on the manifest of the application. FIG. 20 is a schematic diagram illustrating a dynamic update listener registration to the system interface service 211. Each application (an application management service 2001, a general-use application A 2002, and a login application A 2003) that is to receive the dynamic event during starting the image forming apparatus 130 performs the dynamic update listener registration 2005. The system interface service 211 holds the information of each registered application as the list on the ROM 103, as shown in a dynamic update listener registration list 2004. The application registered in the list can receive the dynamic update event. However, in the present embodiment, receiving the event means that it receives the event and responding to the dynamic update. Thus, the general-use application and the login application included in the list is an application which corresponds to the dynamic update.

Figure 21:
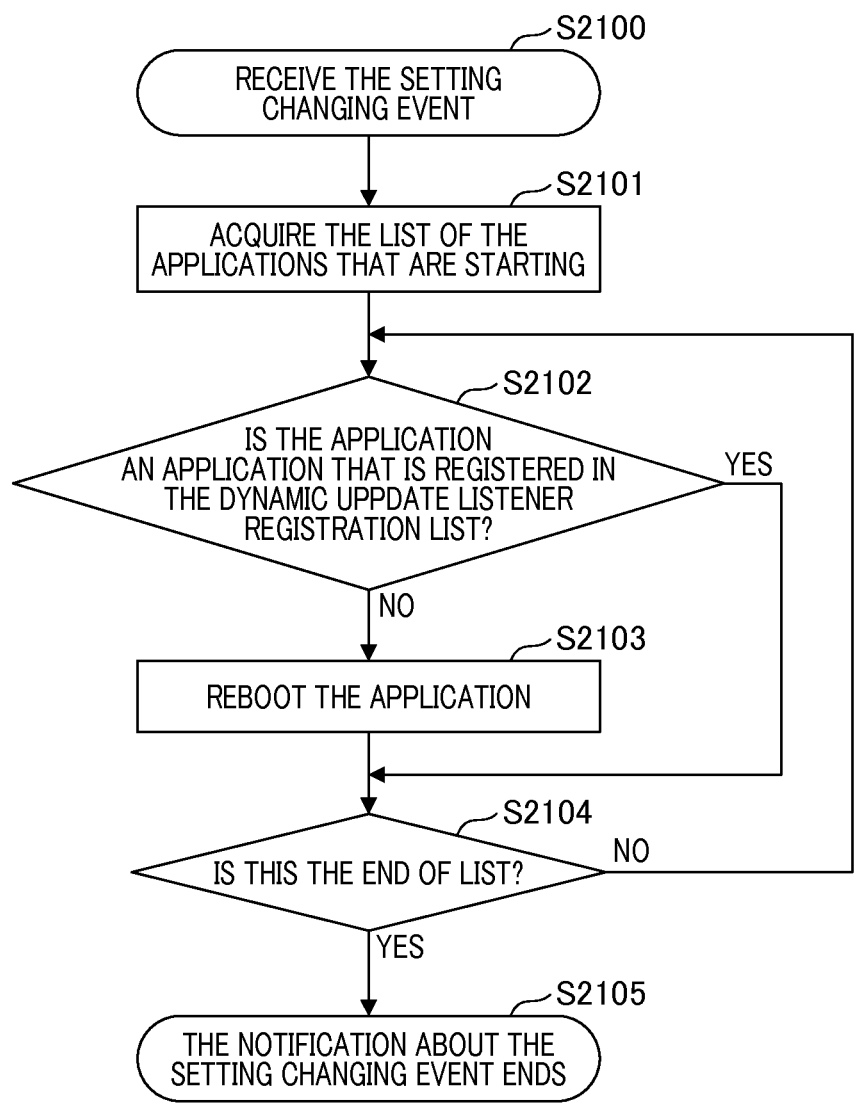
FIG. 21 is a flowchart illustrating the processing performed when the setting changing button is pressed.

FIG. 21 is a flowchart illustrating the processing of the application management service 213 performed when the setting reflecting button 706 is pressed. Note that the processing corresponds to the processing when the user presses the "YES" button 1001 in the determination whether or not the change of the setting is reflected in FIG. 10. Firstly, in step S2100, the processing of the application management service while updating the setting is started. Next, in step S2101, the list of the applications while starting among the general-use applications managed by the application management service 213 is acquired. Next, in step S2102, it is determined whether or not the first application acquired in step S2101 is included in the dynamic update listener registration list 2004. If the first application is not included in the dynamic update listener registration list 2004 (NO), the rebooting of the application, in which the application is stopped and started, is performed. In contrast, if the first application is included in the dynamic update listener registration list 2004 (YES), the processing is not performed and proceeds to step S2104. In step S2104, it is determined whether or not the check has been performed to the end of the list of the applications that are starting. If the check has not been performed to the end of the list (NO), the processing returns to step S2102, and the processing is performed for the next application. In contrast, if the check is performed on all applications (YES), in step S2105, the processing ends.

As described the above, according to the present embodiment, it is possible to control whether or not the application is rebooted depending on whether or not the application is included in the dynamic update listener registration list 2004 of the system interface service 211.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-032980, filed Feb. 24, 2014, which is hereby incorporated by reference wherein in its entirety.

What is claimed is:

1. An image forming apparatus comprising at least one processor and a memory configured to function as:
   a changing unit configured to change a network setting;
   a determination unit configured to determine whether or not an application supports a dynamic update for reflecting the change of the network setting without rebooting the image forming apparatus; and
   a controlling unit configured not to reboot the image forming apparatus associated with the change of the network setting if the determination unit determines that the application supports the dynamic update for the change of the network setting, and to reboot the image forming apparatus if the determination unit determines that the application does not support the dynamic update for the change of the network setting.

2. The image forming apparatus according to claim 1, wherein the controlling unit reboots the image forming apparatus if the application that does not support the dynamic update is a first application which cannot be stopped at any timing.

3. The image forming apparatus according to claim 1, wherein the controlling unit reboots a second application if the application that does not support the dynamic update is the second application which can be stopped at any timing.

4. The image forming apparatus according to claim 3, wherein the controlling unit reboots the second application depending on an item of the network setting changed by the changing unit.

5. The image forming apparatus according to claim 4, wherein the controlling unit reboots the second application if all of the items changed by the changing unit included in the second application are not included in a previously specified item.

6. The image forming apparatus according to claim 3, wherein the controlling unit reboots the second application if the second application changed by the changing unit is not registered in a list of the applications which support the dynamic update.

7. The image forming apparatus according to claim 1, further comprising:
   a setting unit configured to set whether or not the controlling unit reboots the image forming apparatus in advance,
   wherein, if the setting unit sets the controlling unit so as not to reboot the image forming apparatus, the controlling unit does not reboot the image forming apparatus even if there is the application that does not support the dynamic update.

8. The image forming apparatus according to claim 1, further comprising:
   a confirmation unit configured to confirm whether or not to perform a reboot of the image forming apparatus to a user if it is instructed reflect the change of the network setting and the determination unit determines that the application does not support the dynamic update for the change of the network setting,
   wherein the controlling unit reboots the image forming apparatus if an instruction is received to perform a reboot of the image forming apparatus as a result of confirmation by the confirmation unit.

9. A method for controlling an image forming apparatus, the method comprising:
   changing a network setting;
   determining whether or not an application supports a dynamic update for reflecting the change of the network setting without rebooting the image forming apparatus; and
   controlling so as not to reboot the image forming apparatus associated with the change of the network setting if the determining determines that the application supports the dynamic update for the change of the network setting, and to reboot the image forming apparatus if the determining determines that the application does not support the dynamic update for the change of the network setting.

10. The method according to claim 9, wherein the controlling reboots the image forming apparatus if the application that does not support the dynamic update is a first application that cannot be stopped at any timing.

11. The method according to claim 9, wherein the controlling reboots a second application if the application that does not support the dynamic update is the second application which can be stopped at any timing.

12. The method according to claim 11, wherein the controlling reboots the second application depending on an item of the network setting changed by the changing.

13. The method according to claim 12, wherein the controlling reboots the second application if all of the items changed by the changing included in the second application are not included in a previously specified item.

14. The method according to claim 11, wherein the controlling reboots the second application if the second application changed by the changing is not registered in a list of the application which supports the dynamic update.

15. The method according to claim 9, further comprising:
setting whether or not the controlling reboots the image forming apparatus in advance,
wherein, if the setting is set so that the controlling does not reboot the image forming apparatus, the controlling does not reboot the image forming apparatus even if there is the application that does not support the dynamic update.

16. The method according to claim 9, further comprising:
confirming whether or not to perform a reboot of the image forming apparatus to a user if it is instructed reflect the change of the network setting and the determining determines that the application does not support the dynamic update for the change of the network setting,
wherein the controlling reboots the image forming apparatus if an instruction is received to perform a reboot of the image forming apparatus as a result of confirmation by the confirmation unit.

17. A non-transitory storage medium storing a readable program for causing a computer to execute a controlling method executed in an image forming apparatus, the method comprising:
changing a network setting;
determining whether or not an application supports a dynamic update for reflecting the change of the network setting without rebooting the image forming apparatus; and
controlling so as not to reboot the image forming apparatus associated with the change of the network setting if the determining determines that the application supports the dynamic update for the change of the network setting, and to reboot the image forming apparatus if the determining determines that the application does not support the dynamic update for the change of the network setting.

* * * * *